United States Patent
Bowling et al.

(10) Patent No.: US 11,104,307 B2
(45) Date of Patent: Aug. 31, 2021

(54) APPARATUS AND METHOD FOR CONTROLLING AXLE ROTATION DURING AXLE REPLACEMENT

(71) Applicant: TOYOTA MOTOR ENGINEERING & MANUFACTURING NORTH AMERICA, INC., Erlanger, KY (US)

(72) Inventors: Brady Keith Bowling, Ravenswood, WV (US); Joseph Lee Nelon, Fraziers Bottom, WV (US); Douglas John McIntyre, St. Albans, WV (US); Charles Michael Taylor, Glenwood, WV (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 120 days.

(21) Appl. No.: 15/852,852

(22) Filed: Dec. 22, 2017

(65) Prior Publication Data

US 2019/0193690 A1  Jun. 27, 2019

(51) Int. Cl.
*B60S 5/00* (2006.01)
*B23P 6/00* (2006.01)
*B60W 20/00* (2016.01)

(52) U.S. Cl.
CPC . *B60S 5/00* (2013.01); *B23P 6/00* (2013.01); *B60W 20/00* (2013.01)

(58) Field of Classification Search
CPC ... G01B 3/14; G01B 3/20; G01B 3/22; G01B 3/38; G01B 21/02; B60S 5/00
USPC .................................. 29/464, 466, 281.5
See application file for complete search history.

(56) References Cited

U.S. PATENT DOCUMENTS

| | | | |
|---|---|---|---|
| 4,634,139 A | 1/1987 | Watanabe et al. | |
| 5,070,575 A | 12/1991 | Redman et al. | |
| 5,557,992 A | 9/1996 | Macor | |
| 5,651,588 A | 7/1997 | Kato | |
| 5,732,455 A * | 3/1998 | Diede | B23K 37/053 269/311 |
| 5,893,291 A | 4/1999 | Salazar | |
| 8,108,978 B2 * | 2/2012 | Van Zile, III | B23K 37/0443 269/45 |
| 8,393,407 B2 | 3/2013 | Freed | |
| 10,150,192 B1 * | 12/2018 | Navarro, Sr. | B23Q 3/186 |
| 2003/0079325 A1 * | 5/2003 | Wu | B25B 27/00 29/281.5 |
| 2009/0220314 A1 * | 9/2009 | Collado Briceno | B23B 47/28 408/241 G |

(Continued)

*Primary Examiner* — Christopher M Koehler
(74) *Attorney, Agent, or Firm* — Oblon, McClelland, Maier & Neustadt, L.L.P.

(57) ABSTRACT

Unlike axle replacement on vehicles, where the weight of the vehicle and air-assisted tools may be used, replacement of axle shafts in confined spaces (e.g. benchtop testing rigs) demand improved methods for controlling axle rotation during loosening and tightening of hub nuts. The present disclosure relates to an apparatus for controlling axle rotation during axle shaft replacement in confined spaces. The apparatus further includes a safety mechanism to prevent accidental team member injury caused by an independently rotating axle. Additionally, the disclosure describes a method of the apparatus for efficient loosening and tightening of hub nuts, reducing team member physical burden and expediting axle shaft replacement.

6 Claims, 10 Drawing Sheets

(56) References Cited

U.S. PATENT DOCUMENTS

| | | | | |
|---|---|---|---|---|
| 2010/0257718 A1* | 10/2010 | Garfin | ............... | E04B 1/34815 29/464 |
| 2012/0030957 A1* | 2/2012 | Kipnes | ................. | G01B 3/20 33/701 |
| 2012/0048176 A1* | 3/2012 | Stoffel | ................. | G01B 3/20 116/284 |
| 2012/0246955 A1* | 10/2012 | Smith | .................. | G01B 3/22 33/517 |
| 2013/0055805 A1* | 3/2013 | Conley | ................. | B60T 7/06 73/121 |
| 2014/0283359 A1* | 9/2014 | DePietro | ............. | E02D 29/12 29/466 |
| 2015/0052722 A1* | 2/2015 | Ke | ................. | H01L 21/6835 29/281.5 |
| 2016/0023067 A1* | 1/2016 | Bettencourt | ........ | B23P 19/007 29/464 |

* cited by examiner

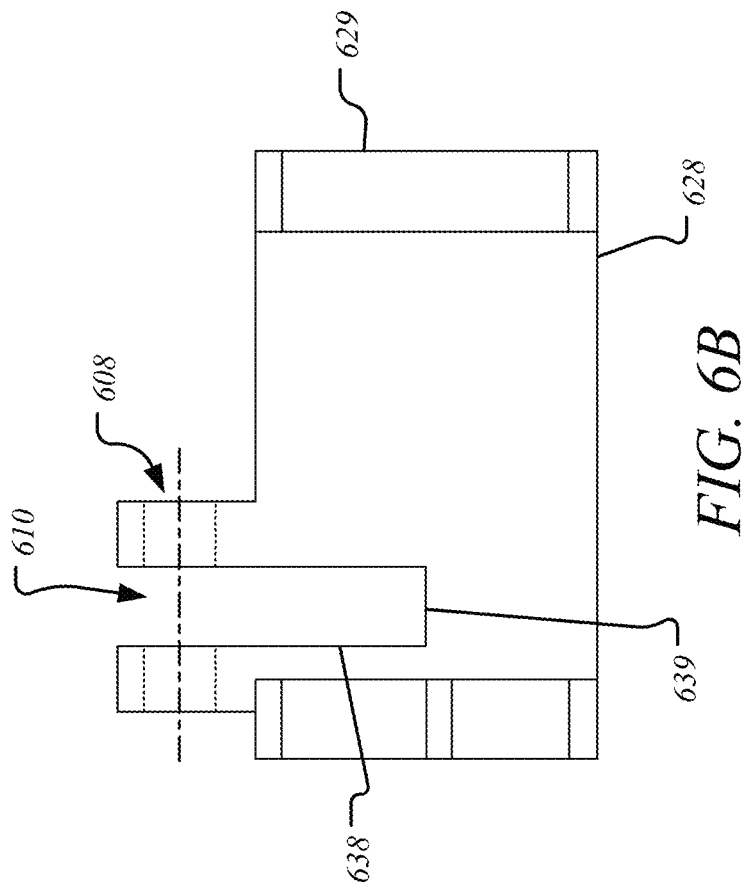
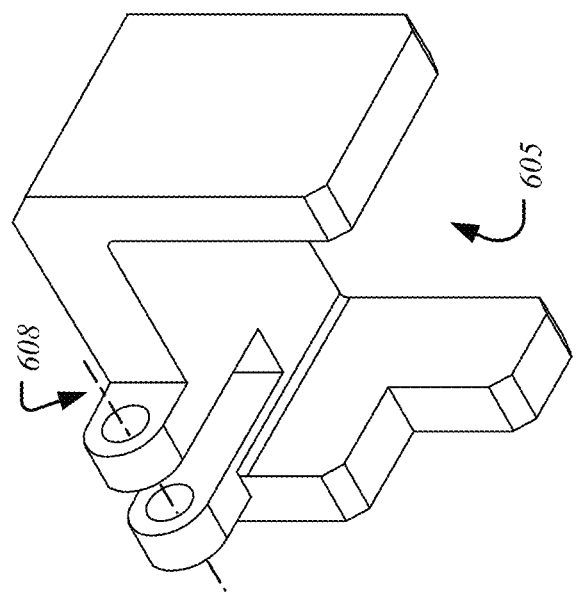
*FIG. 6B*
*FIG. 6A*

APPARATUS AND METHOD FOR CONTROLLING AXLE ROTATION DURING AXLE REPLACEMENT

BACKGROUND

Efficient benchtop testing of different vehicle transmissions and engines requires rapid and safe axle shaft replacement. Unlike replacing an axle shaft on a vehicle, the confined spaces of a benchtop testing system demand new approaches to preventing rotation of the axle shaft during hub nut loosening and tightening. U.S. Pat. No. 4,634,139 entitled "Rear fork of motorcycle" by Watanabe et al. describes a device for limiting the uni-directional rotation of an axle by contact with the rear fork arms.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

High-throughput, benchtop performance testing systems regularly evaluate a variety of engine models and transmission types. Replacing a corresponding axle half shaft requires the loosening and tightening of a number of axle stud nuts, made difficult by the free rotation of the axle. The present disclosure relates to an apparatus and method for controlling the rotation of an axle during axle half shaft replacement on a performance testing device.

The apparatus of the present disclosure relates to a rigid implement configured to be fixed at one end to a benchtop frame and fitted concentrically around a stud at the other. Further, the present disclosure describes a latching mechanism that ensures the rigid implement remains adjacent to the stud of interest. A handle and safety mechanism are also described that improve user operability of the apparatus.

The present disclosure further relates to a method employing the apparatus for replacement of an axle half shaft.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6A is a perspective view of a latch component of an embodiment of the apparatus;

FIG. 6B is an axial schematic of a latch component of an embodiment of the apparatus;

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Figure 1A:
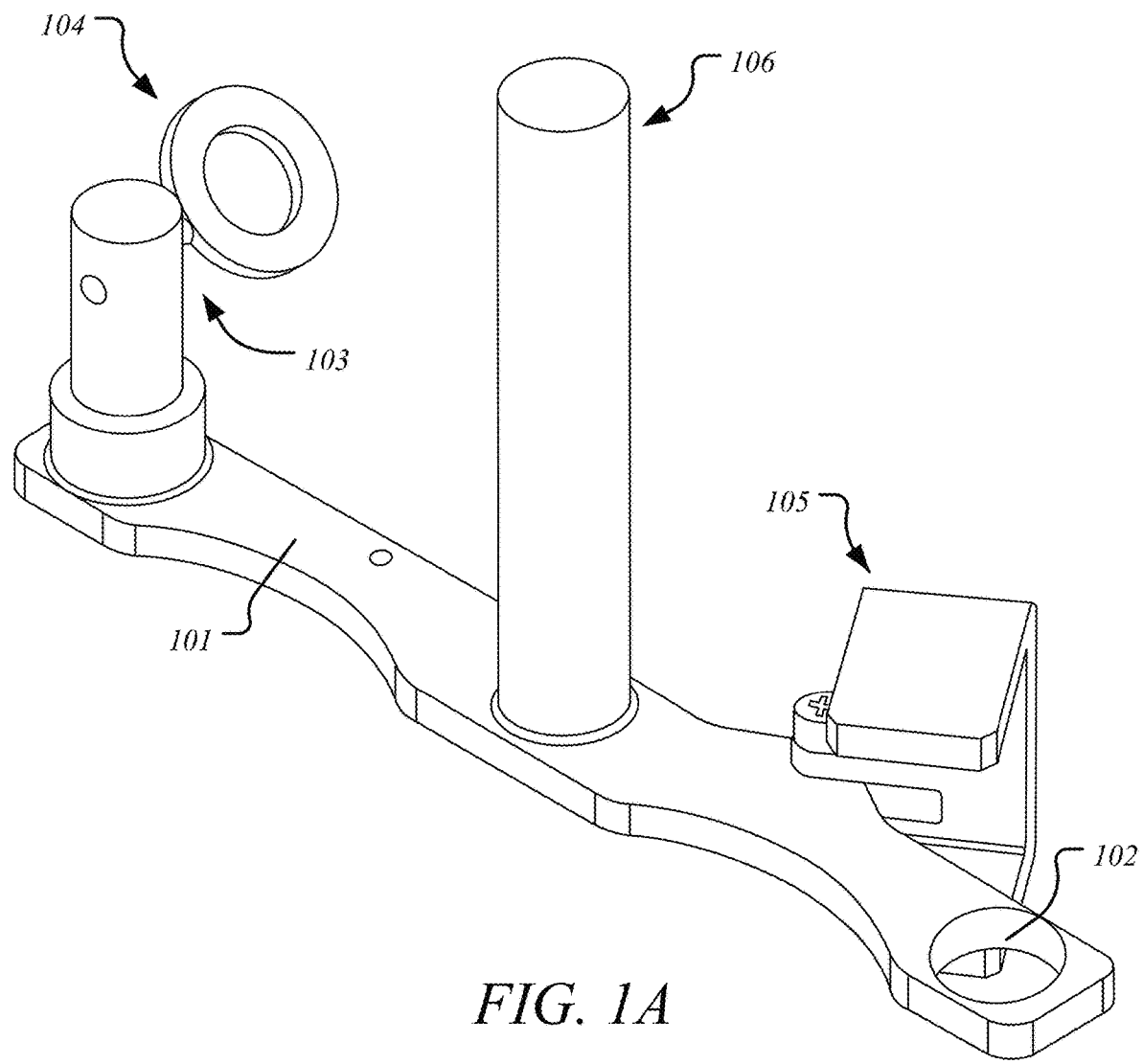
FIG. 1A is a perspective view of an embodiment of the apparatus assembly.

FIG. 1A is a perspective view of an embodiment of the apparatus assembly. A safety cylinder 103 is disposed on a face at a first end of a rectangular plate 101. A pin 104 is engaged within a hole of the safety cylinder 103. A hole 102 is disposed at a second end of the rectangular plate 101. A handle 106 is disposed on a face of the rectangular plate 101, between the safety cylinder 103 and the hole 102. A latch 105 is attached via hinge to an edge of the rectangular plate 101 between the hole 102 and the handle 106.

Figure 1B:
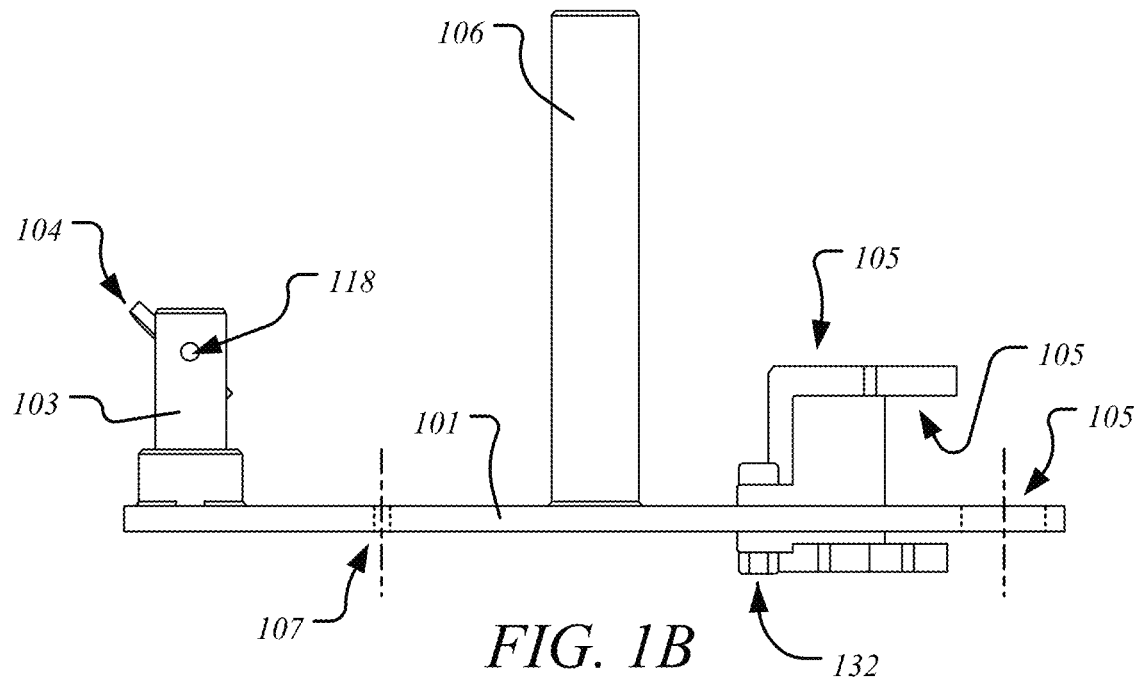
FIG. 1B and FIG. 1C are vertical and lateral schematics of an embodiment of the apparatus assembly, respectively.
Figure 1C:
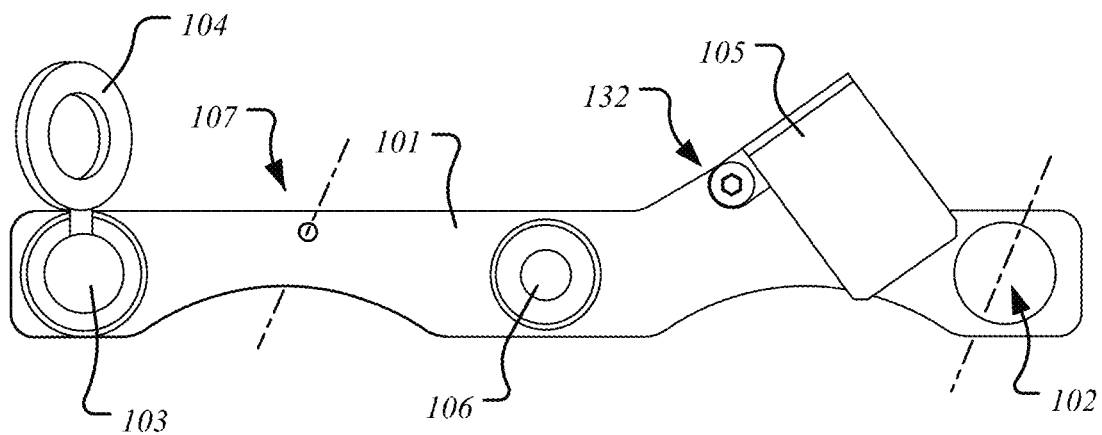

Similarly, FIG. 1B and FIG. 1C are vertical and lateral schematics of an embodiment of the apparatus assembly, respectively. In an exemplary embodiment, addressing both FIG. 1B and FIG. 1C, a handle 106 and safety cylinder 103 are disposed on a contiguous face of a rectangular plate 101. A safety cylinder 103 is disposed at a first end of the rectangular plate 101, with a hole 102 disposed at a second end of the rectangular plate 101. A pin 104 is engaged with a pin hole 118 of the safety cylinder 103. During operation, the safety cylinder 103 and pin 104 are rigidly fixed (in an axial dimension) to an external frame. A handle 106 is disposed on the rectangular plate between the first end and the second end. A latch 105 is attached via hinge 132 to an edge of the rectangular plate 101 between the hole 102 and the handle 106. The latch 105 is configured to allow a corresponding hub to engage with the interior walls 133 of the latch 105. A tether hole 107 is disposed between the handle 106 and the safety cylinder 103. The tether hole 107 is configured to receive a stationary end of a tether coupled to the pin 104. The handle 106 allows for positioning of the apparatus with respect to an axle and hub. With safety cylinder 103 and pin 104 engaged with an external frame and preventing axial translation of the apparatus, the hole 102 can be concentrically engaged with a corresponding nut and the latch 105 rotated about its hinge 132 to engage with opposing faces of a hub.

Figure 2A:
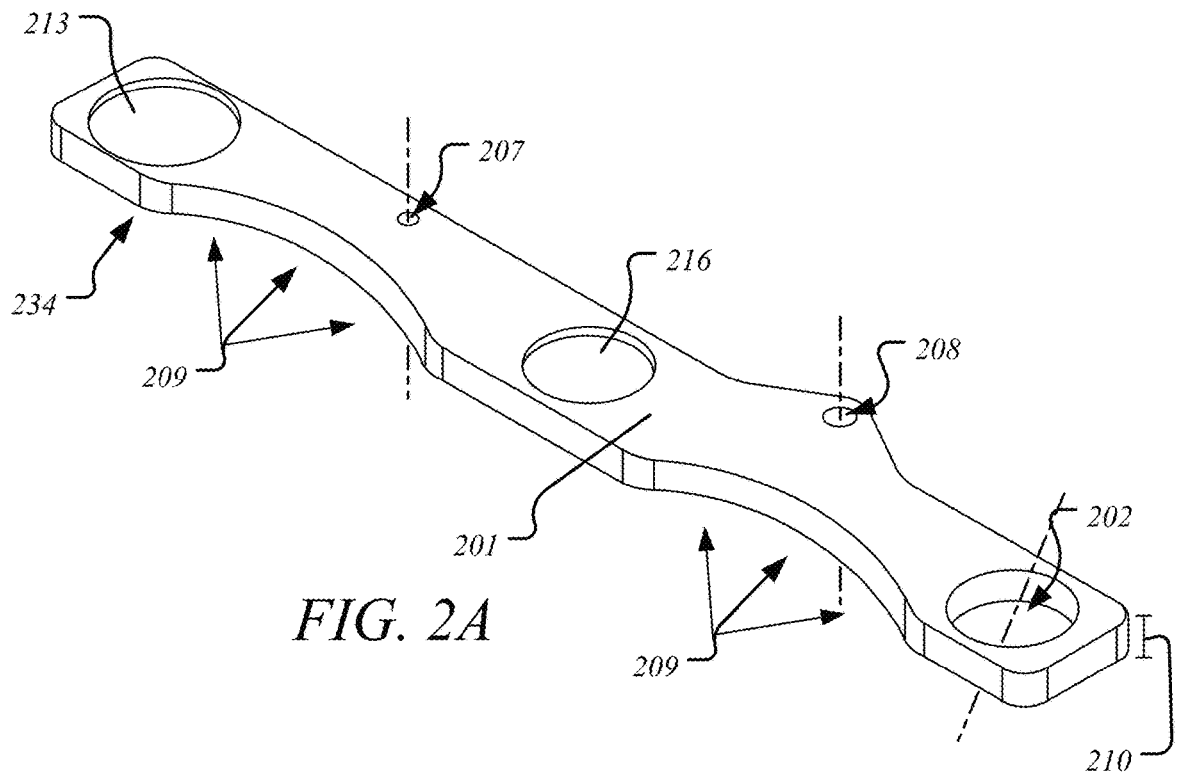
FIG. 2A is a perspective view of a rectangular plate component of an embodiment of the apparatus.
Figure 2B:
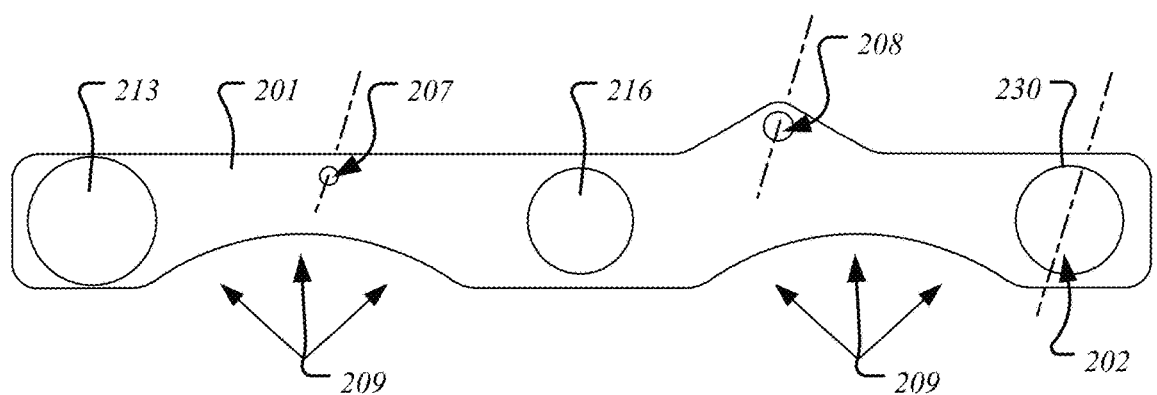
FIG. 2B is a lateral schematic of a rectangular plate component of an embodiment of the apparatus.

FIG. 2A and FIG. 2B are a perspective view and a lateral schematic, respectively, of a rectangular plate 201 component of an embodiment of the apparatus. The rectangular shape of the plate in the present disclosure should not be considered limiting and is merely representative of a variety of shaped materials configured as a rigid implement to provide a connection between an external frame and a nut. Further, the dimensions of the rectangular plate are defined by the parameters of a specific application, and are therefore not limited to that which is described herein. In an exemplary embodiment, a recess for a safety cylinder 213 is disposed on a face at a first end of a rectangular plate 201. The rectangular plate 201 is of thickness 210 and material of sufficient rigidity to withstand applied forces resulting from rotation of an axle (e.g. wood, polymers, ceramics, metals, etc.). A hole 202 is disposed at a second end of the rectangular plate 201. The hole 202 is of a diameter 230 relative to the diameter of a corresponding nut. On a contiguous face, between the recess for a safety cylinder 213 and the hole 202, a recess for a handle 216 is disposed. A hinge hole 208 is disposed adjacent to an edge of the rectangular plate 201, between the recess for a handle 216 and the hole 202. In another embodiment, the hinge hole 208 is disposed on a protrusion of the rectangular plate 201, extending from an edge of the rectangular plate 201 a distance relative to the geometry of the hub in regards to nut location. The presence or absence of a protrusion is configured to allow the latch to properly engage with the hub when the apparatus is in use. A tether hole 207 is disposed between the recess for a safety cylinder 213 and the recess for a handle 216. In another exemplary embodiment, curved recesses 209 are disposed on an edge surface 234 of the rectangular plate 201. These curved recesses 209, and related variations present in other embodiments that modify the original structure of the rectangular plate 201, are configured to allow for a linear connection between external support structures and the nut of interest. In this embodiment, the curved recesses 209 are configured to accommodate the location of subsequent nuts in relation to a first nut.

Figure 3A:
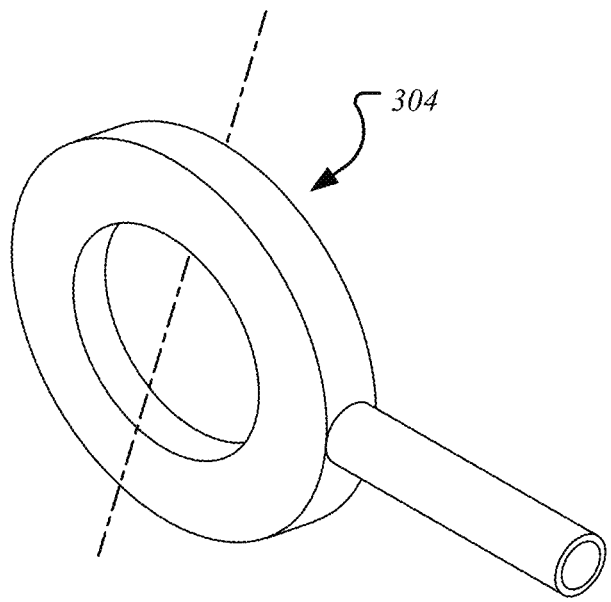
FIG. 3A is a perspective view of a pin component of an embodiment of the apparatus.

FIG. 3A is a perspective few of a pin component of an embodiment of the apparatus. In an exemplary embodiment, while a safety cylinder of a plate is engaged with an external frame to rigidly fix the apparatus, a pin 304 is inserted into the safety cylinder to limit lateral translation of the apparatus. Further, when the safety cylinder is engaged with the safety stop of a benchtop testing system for automotive transmissions, the pin 304 prevents accidental user injury associated with unintentional system operation. While the exemplary embodiment in FIG. 3A relates to a washer-type component coupled to a cylinder-type component, the pin 304 may comprise any shape that is functionally similar and suitably matched to a hole of the safety cylinder.

Figure 3B:
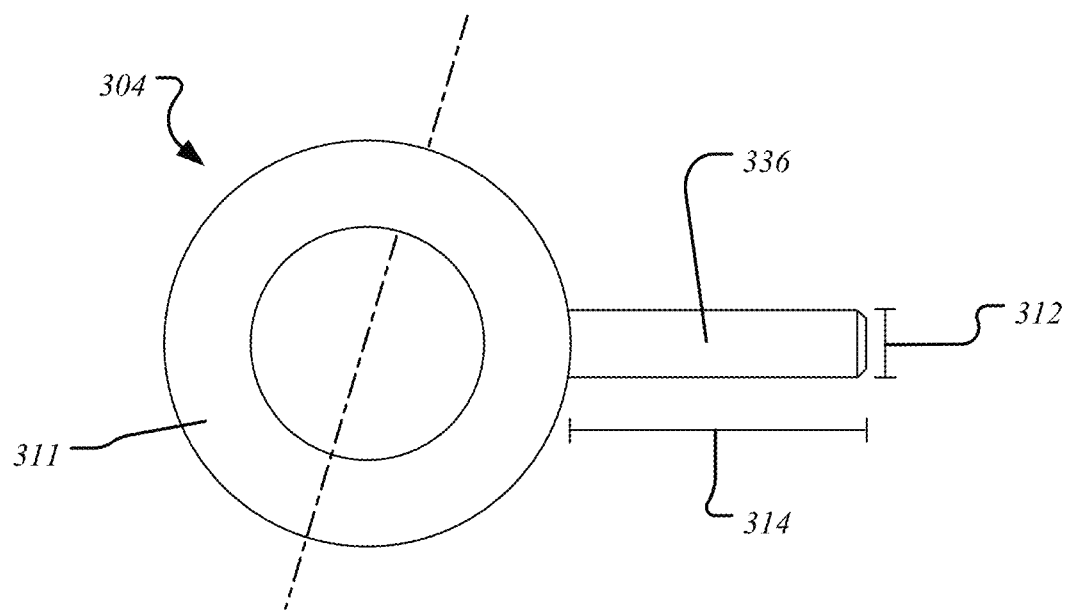
FIG. 3B is a lateral schematic of a pin component of an embodiment of the apparatus.

FIG. 3B is a lateral schematic of a pin component of an embodiment of the apparatus. In an exemplary embodiment, the pin 304 includes a washer 311 coupled to a cylindrical aspect 336 on a circumferential face of the washer 311. The cylindrical aspect 336 has a length 314 and a diameter 312. The length 314 of the cylindrical aspect 336 is defined by the diameter of a safety cylinder. The diameter 312 of the cylindrical aspect 336 is defined by the diameter of the hole of the safety cylinder. While the exemplary embodiment relates to a washer 311 coupled to a cylindrical aspect 336, the washer 311 is merely representative of a variety of components configured for manual manipulation by a user. Further, while the exemplary embodiment relates to a cylindrical aspect 336, the shape of the cylindrical aspect 336 is merely representative of a variety of shaped components configured to engage with a hole.

Figure 4A:
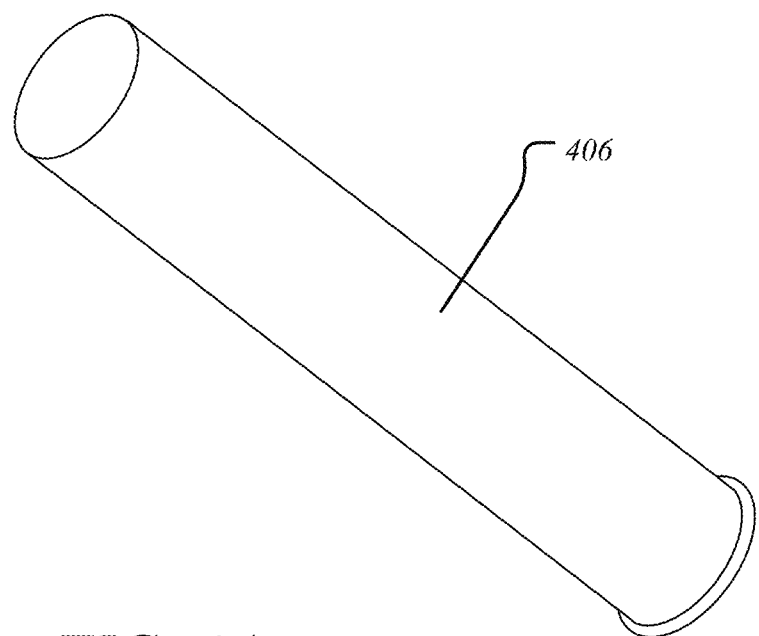
FIG. 4A is a perspective view of a handle component of an embodiment of the apparatus.

FIG. 4A is a perspective view of a handle component of an embodiment of the apparatus. In an exemplary embodiment, the handle component 406 is of a cylindrical shape. The cylindrical shape of the handle component 406, however, is merely representative of a variety of shaped-components configured for manual manipulation by a user. In an exemplary embodiment, the handle component 406 is configured to facilitate user positioning of the apparatus on a benchtop testing system.

Figure 4B:
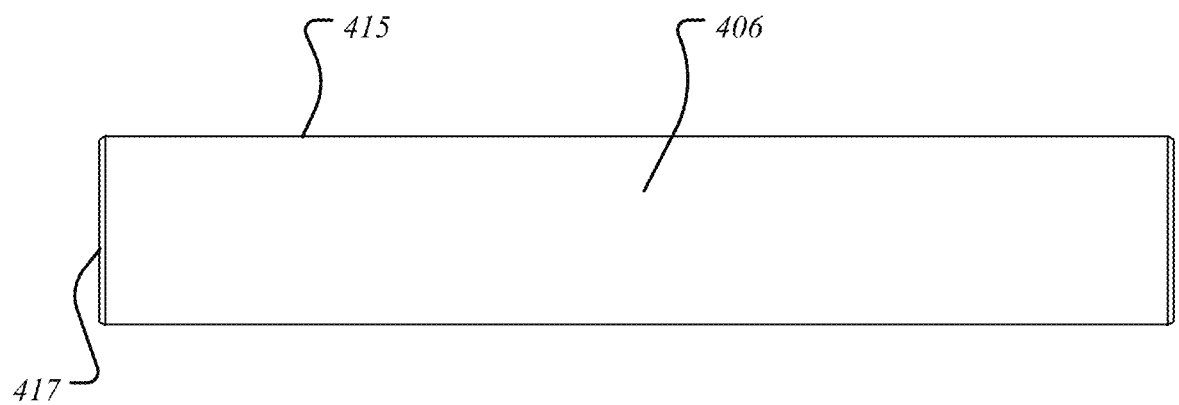
FIG. 4B is a lateral schematic of a handle component of an embodiment of the apparatus.

FIG. 4B is a lateral schematic of a handle component of an embodiment of the apparatus. In an exemplary embodiment, the handle component 406 is of a cylindrical shape with length 415 and diameter 417 of appropriate dimensions to facilitate user handling of the apparatus. A maximum diameter 417 of the handle component 406 is defined by the dimensions of the face of a plate that an end of the handle component 406 is coupled to.

Figure 5A:
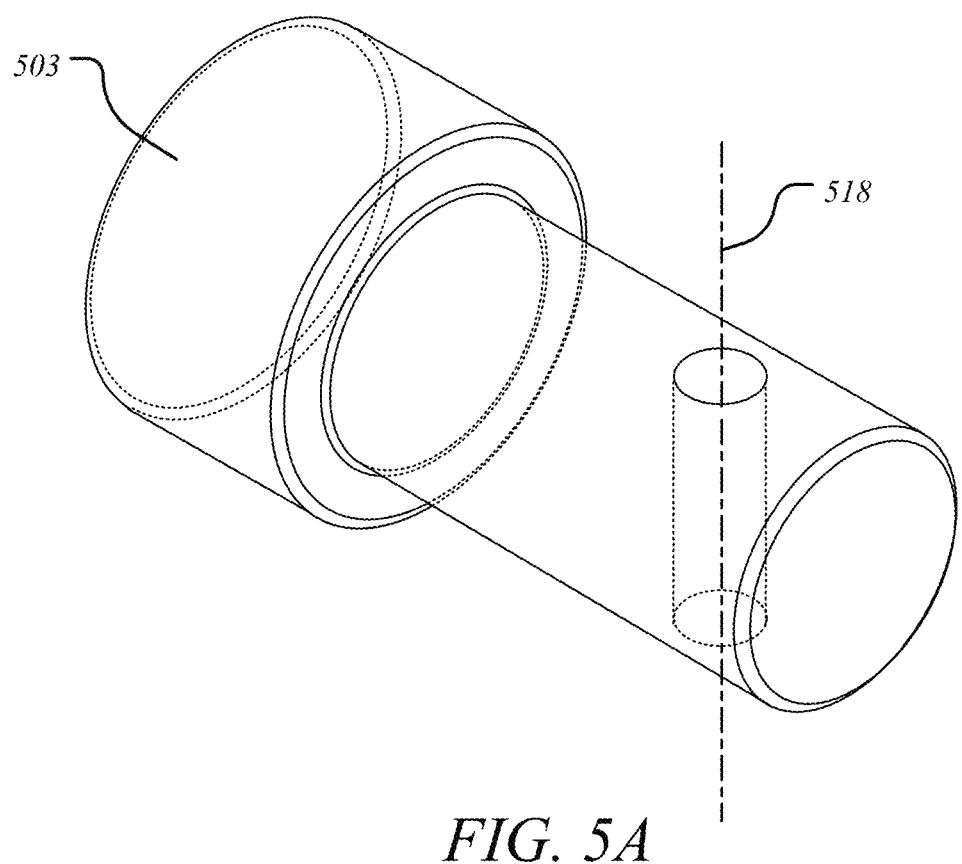
FIG. 5A is a perspective view of a safety component of an embodiment of the apparatus.

FIG. 5A is a perspective view of a safety component of an embodiment of the apparatus. The safety component 503 contains a transverse hole 518 at its distal end. The safety component 503 is configured to engage with a hole of an external frame to provide rigid fixation of the apparatus. In an exemplary embodiment, the safety component 503 is of a cylindrical shape and configured to engage a safety stop of a benchtop testing system for automotive transmissions. The shape of the safety component 503, however, is not limiting and is merely representative of a variety of shaped components configured to engage with an external frame and rigidly limit motion.

Figure 5B:
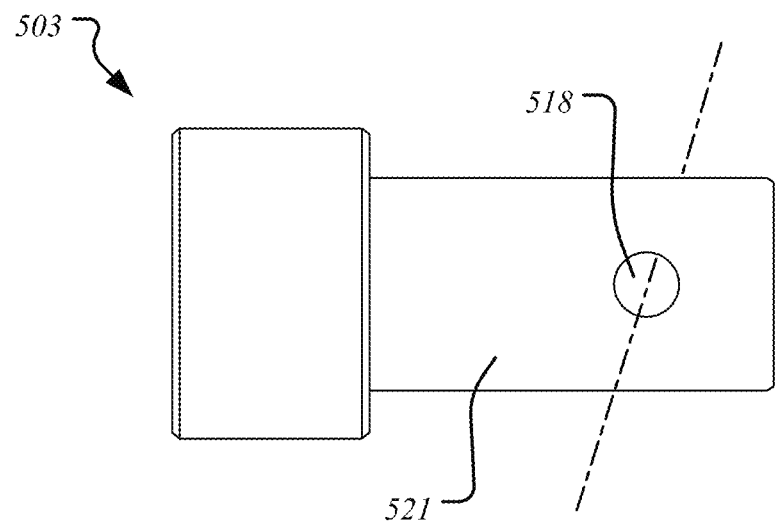
FIG. 5B and FIG. 5C are lateral schematics of a safety component of an embodiment of the apparatus.
Figure 5C:
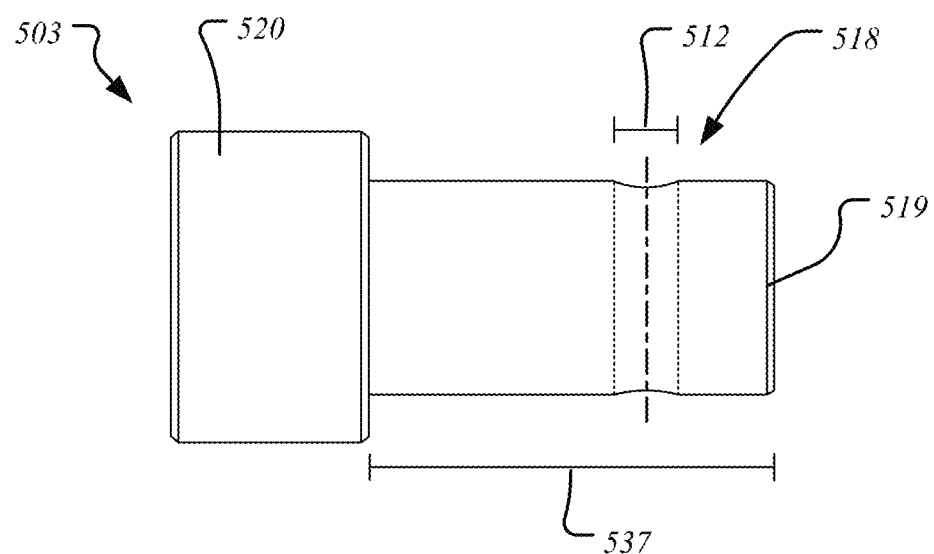

FIG. 5B and FIG. 5C are lateral schematics of a safety component of an embodiment of the apparatus. In an embodiment, the safety component 503 is of a cylindrical shape with a diameter 521 configured to engage with a hole of an external frame to provide rigid fixation of the apparatus. A transverse hole 518 in a distal aspect of the safety component is configured to receive a pin of a diameter relative to the diameter 512 of the transverse hole 518. In an exemplary embodiment, the safety component 503 is of a cylindrical shape with a distal aspect diameter 519 being different from a proximal aspect diameter 520. The distal aspect diameter 519 is configured to engage a hole of an external frame and is of a length 537 substantially longer than the axial length of an external hole. In this embodiment, the external frame is a benchtop testing system for automotive transmissions, and the safety component is configured to engage a safety stop to prevent accidental user injury.

FIG. 6A is a perspective view of a latch component of an embodiment of the apparatus. The latch 605 rotates about a hinge hole 608 that is concentrically aligned with a hole on a plate. In an exemplary embodiment, the latch 605 rotates about a hinge hole to allow for engagement and disengagement with an axle hub.

FIG. 6B is an axial schematic of a latch component of an embodiment of the apparatus. A hinge hole 608 allows the latch 605 to rotate. A slit 610 is of a width 639 to engage with the thickness of the plate and a depth 638 to allow for bounded rotation of the latch 605 about the hinge hole 608. The depth 638 of the slit 610 is sufficient to engage fully with the thickness of the plate in a first position and allows complete disengagement with the thickness of the plate in a second position. In an exemplary embodiment, this rotation allows the apparatus to be moved from a first position with respect to a nut to a second position with respect to a nut. The latch length 629 is sufficient to restrict lateral motion of the apparatus when appropriate force is applied. The latch width 628 is defined by the application. In an exemplary embodiment, the latch width 628 is of a size to engage with opposing faces of an axle hub of a benchtop testing system for automotive transmissions.

Figure 7:
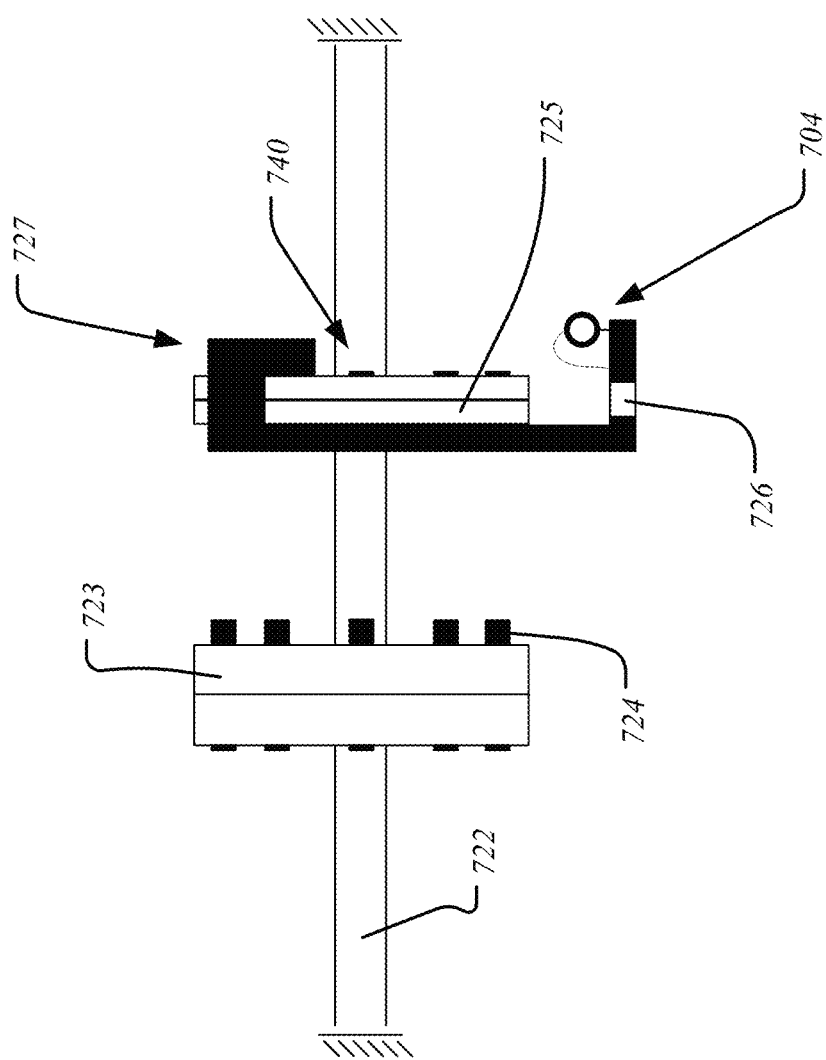
FIG. 7 is an exemplary embodiment of the apparatus employed in a benchtop testing system.

FIG. 7 is an exemplary embodiment of the apparatus employed in a benchtop testing system for automotive transmissions. A reference hub 725 is coupled to a dynamometer at a first end and an axle hub 723 at a second end. An axle 722 is attached to the axle hub 723 via hub nuts 724. The apparatus 727 engages first with the benchtop testing system at a safety lock 726 via safety cylinder. After the safety cylinder is engaged with the safety lock 726, the apparatus 727 is position over the reference hub 725, wherein a hole at the second end of the apparatus is fitted around a reference nut 740 and the latch is rotated to engage with opposing surfaces of the reference hub 725. Following positioning of the latch, loosening and tightening of the hub nut 724 may proceed. In another embodiment, a pin 704 is inserted into the safety cylinder following engagement of the safety cylinder with the safety lock 726 of the benchtop testing system. The pin 704 ensures fixation of the apparatus 727, thus preventing accidental user injury resulting from unintentional axle rotation. In an additional embodiment, a tether 740 is configured to attach the pin 704 to the apparatus 727.

Figure 8:
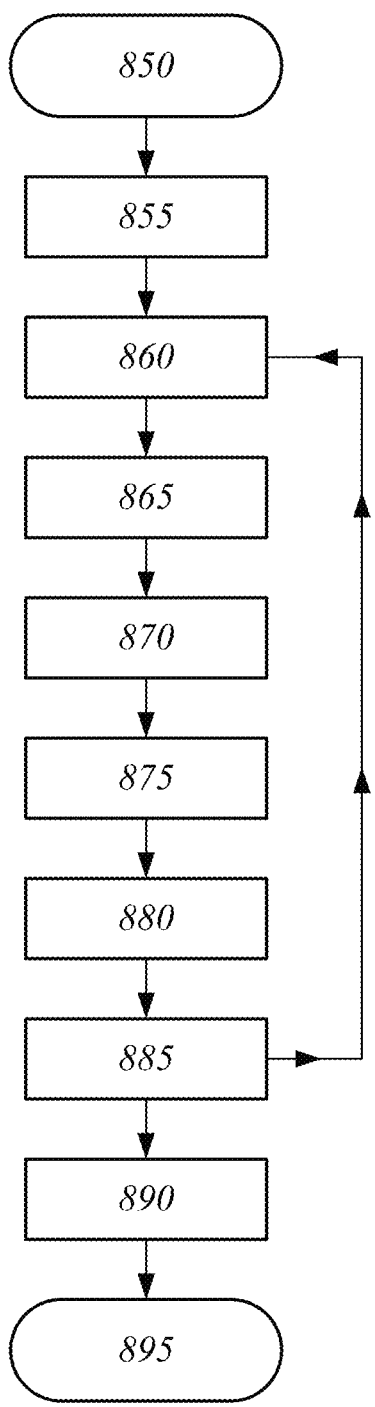
FIG. 8 is a process flowchart of an embodiment of the apparatus employed in a benchtop testing system.

FIG. 8 is a process flowchart of an embodiment of the apparatus employed for loosening or tightening of multiple nuts in a benchtop testing system. In an exemplary embodiment, the apparatus is employed for the sequential loosening and/or tightening of a series of nuts during axle shaft replacement. First 850, a first end of the apparatus is coupled to a stationary aspect of an external frame. Then, the second end of the apparatus is engaged with a first reference nut on a reference hub 855. A latch of the apparatus is closed around the reference hub 860 to prevent lateral translation of the apparatus. With the apparatus fixed to the external frame, fitted around the first reference nut, and with the latch in the closed position around the reference hub, a first nut can be loosened and/or tightened 865. With the first nut loosened and/or tightened, the latch can be moved to the open position 870, the apparatus translated laterally to disengage from the first reference nut 875, and the axle and hub can be rotated 880 to provide access to a subsequent nut and subsequent reference nut, as necessary. When appropriate, the hub is rotated and properly positioned with respect to subsequent nuts. The apparatus can then be translated laterally to engage with a second reference nut 885, and the latch, similarly to the first nut, can be moved to a closed position around the reference hub 860. After securing the reference nut and hub, a second nut can be loosened and/or tightened 865. Following loosening and/or tightening of the second nut, the latch can be rotated to an open position 870 and subsequent nuts can be loosened and/or tightening, as needed, in the abovementioned manner. When all nuts have been attended to and with the latch in the open position, the second end of the apparatus can be disengaged from the reference hub 890, thus allowing the safety cylinder to be decoupled from the external frame 895 at the first end. It should not be implied that the hub (of interest) and reference hub are necessarily different hubs, but are merely referenced as such herein to provide clarification to the method of the apparatus.

EXAMPLE 1

In an exemplary embodiment of the invention, the apparatus is deployed in an Ono Sokki dynamometer for daily quality testing of two wheel drive and four wheel drive transmissions. To facilitate testing of both transmission types, efficient replacement of the axle shaft is required. With the apparatus successfully coupled to the system safety interlock and a reference hub nut of the dynamometer, the latch is moved to the closed position to prevent lateral translation of the apparatus. Utilizing a 14" wrench, force is applied to an axle hub nut, loosening it from the axle hub bolt. Subsequent loosening of each axle hub nut, via manipulation of the apparatus and rotation of the axle, allows for expedited replacement of the axle shaft. In laboratory testing, the use of the apparatus, in comparison to standard protocol, provides a 45% reduction in the force required to loosen each axle hub nut.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An apparatus configured to control axle rotation, comprising:
   a body of a predetermined thickness having a first planar face with a first dimension and a second dimension, the second dimension being shorter than the first dimension;
   a first projection disposed on the first planar face at a first end of the body, the first projection being normal to the first planar face of the body;
   a hole, arranged opposite the first projection along the first dimension of the body, disposed at a second end of the body and extending through the predetermined thickness of the body; and
   a hinge disposed on an edge of the first dimension of the body between the hole and the first projection, wherein the hinge rotates about a hinge axis that is parallel to a third dimension of the body defined by the predetermined thickness of the body,
   wherein the hinge has an internal hinge width defining a distance between internal faces of the hinge, the distance between the internal faces of the hinge defining a captive area configured to, when the hinge is in a captive position, constrain the hinge and an axle hub between the internal faces of the hinge.

2. The apparatus of claim 1, further comprising a second projection disposed between the first end of the body and the second end of the body and normal to the first planar face of the body.

3. The apparatus of claim 2, wherein the hinge is disposed between the hole and the second projection.

4. The apparatus of claim 1, wherein the first projection includes a distal portion which is narrower than a proximal portion in a step-wise manner.

5. The apparatus of claim 4, wherein the first projection includes a transverse hole disposed within the distal portion.

6. The apparatus of claim 5, further comprising a pin, wherein
- a diameter of the pin is smaller than a diameter of the transverse hole of the distal portion of the first projection, and
- a length of the pin is longer than a width of the first projection.

* * * * *